(12) United States Patent
Langhans

(10) Patent No.: US 7,349,455 B2
(45) Date of Patent: Mar. 25, 2008

(54) SOLID-STATE LASER WITH COMPENSATION FOR THERMOOPTICAL EFFECTS

(76) Inventor: Lutz Langhans, Fasanenweg 25, 82319 Starnberg (DE)

( * ) Notice: Subject to any disclaimer, the term of this patent is extended or adjusted under 35 U.S.C. 154(b) by 108 days.

(21) Appl. No.: 11/338,420

(22) Filed: Jan. 24, 2006

(65) Prior Publication Data

US 2006/0171433 A1   Aug. 3, 2006

(30) Foreign Application Priority Data

Jan. 28, 2005   (DE) .................... 10 2005 004 131

(51) Int. Cl.
*H01S 3/14* (2006.01)

(52) U.S. Cl. .......................................... 372/39; 372/69
(58) Field of Classification Search .................... 372/39
See application file for complete search history.

(56) References Cited

U.S. PATENT DOCUMENTS

| | | | | | |
|---|---|---|---|---|---|
| 4,872,177 A | * | 10/1989 | Baer et al. | ..................... | 372/75 |
| 5,335,237 A | * | 8/1994 | Zapata | ........................ | 372/33 |
| 2003/0233974 A1 | * | 12/2003 | Pollak | ......................... | 117/13 |

FOREIGN PATENT DOCUMENTS

| | | |
|---|---|---|
| DE | 195 10 713 A1 | 9/1996 |
| DE | 195 21 943 A1 | 12/1996 |
| EP | 0 202 322 B1 | 11/1986 |
| JP | 01205484 * | 8/1989 |

* cited by examiner

*Primary Examiner*—Dung T. Nguyen
(74) *Attorney, Agent, or Firm*—Fulbright & Jaworski L.L.P.

(57) ABSTRACT

To compensate for undesirable thermooptical effects in optical pumping of solid-state laser rods, regions of the lateral surface are heated in such a way that reverse thermal gradients are created at these locations. This is achieved by providing said regions with a radiation-absorbing layer which is heated by pump radiation and laser radiation.

8 Claims, 1 Drawing Sheet

SOLID-STATE LASER WITH COMPENSATION FOR THERMOOPTICAL EFFECTS

Figure 1:
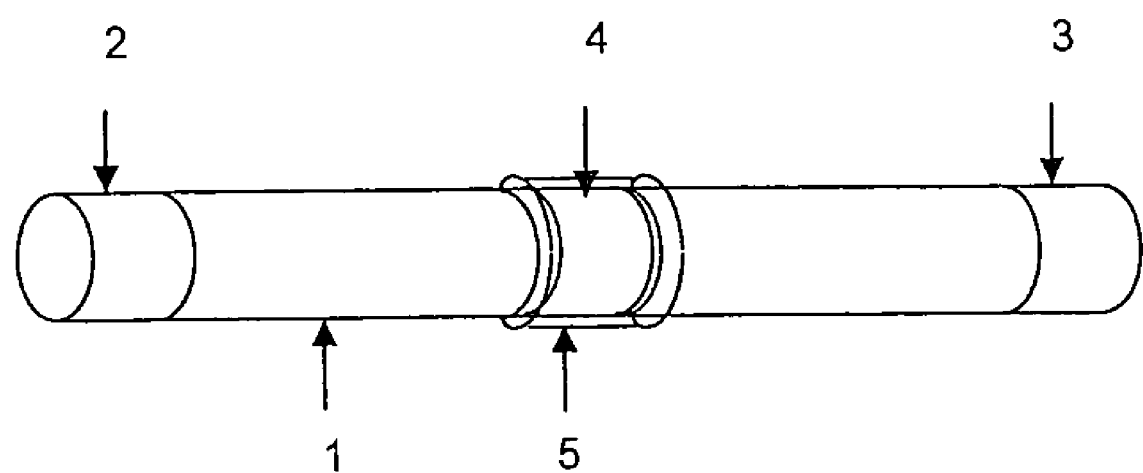

This application claims priority from German Patent Application No: 10 2005 004 131.0 filed Jan. 28, 2005, incorporated herein by reference in its entirety.

The invention relates to a solid-state laser for material processing. Solid-state lasers and $CO_2$ lasers are the most prevalent for use in material processing. Although the ~1 µm wavelength of the solid-state lasers is more favorable for most applications, at higher power levels (>500 W) $CO_2$ lasers are more advantageous due to their superior beam quality.

The inferior beam quality of high-power solid-state lasers results from thermooptical effects in the laser crystal. In optical pumping, thermal lens effects are created in the laser crystal. The crystal is heated by absorption of pump radiation in the volumetric space, whereas heat dissipation or cooling occurs via the surface(s) of the crystal. This produces thermal gradients in the crystal, as well as optical effects resulting from thermal stress and the dn/dt (which is positive for practically all common laser-crystals).

For a cylindrical laser rod, a radial temperature gradient is produced which has the highest temperature in the center of the rod and a temperature drop toward the edge. In this manner the rod takes on the characteristics of a convergent lens (with positive dn/dt), the focal length of which depends, among other factors, on the pump power. Typical values for the refractive power of the thermal lens are 1-3 diopters per kilowatt power for lamp-pumped Nd:YAG lasers. Higher-order effects such as aberrations and stress birefringence also occur. All these factors result in serious impairment of the beam quality at higher power.

For this reason, since the introduction of solid-state lasers there has been a search for ways to reduce or compensate for these thermooptical effects. In the meantime a number of designs have been developed for this purpose, such as the slab laser (U.S. Pat. Nos. 3,663,126 and 4,214,716), ES laser (DE 37 25 144), disk laser (DE 43 44 227), and fiber laser (WO 95/10868), to name only the most important examples. Lamp-pumped solid-state lasers having cylindrical crystal rods are still the most commonly used solid-state lasers, but for this type there is no satisfactory design thus far for compensating for the thermooptical effects.

The object of the present invention is to provide a design which compensates almost entirely for the thermooptical effects in a solid-state laser rod. This object is achieved by the features of the invention stated in Claims 1-3.

Based on the explanation of how the thermal lens is generated, one can see that a reverse radial gradient in the rod, i.e., higher temperatures at the edge than in the center, would produce a thermal lens having a negative focal length. Thus, if the ends of the rod were heated instead of cooled at a certain length on the circumference, negative thermal lenses could be created at that location. These negative lenses could compensate, at least partially, not only for the positive thermal lens of the optically pumped center section of the laser rod, but also for the stress birefringence.

The rod ends could be heated by use of heating coils or heating foils, for example. Since the positive thermal lens of the rod is approximately proportional to the pump power, the heat power of the rod ends would also necessarily have to be controlled in proportion to the pump output.

However, active heating of the rod ends with appropriate control is rather difficult and complex. A simpler possibility would be passive heating of the rod ends. If the ends are not cooled at a certain length (i.e., if the ends are not situated in cooling water) and the lateral surface is coated with a strongly absorbing material, the surface is heated by pump radiation and scattered radiation. This radiant heating would be automatically proportional to the pump power and yet very simple technically, and would create a reverse thermal gradient at the ends of the rod.

However, the pump radiation and scattered radiation which impact these absorbing surface regions are not sufficient to fully compensate for the thermal effects in the central section of the rod. The thermal lens for the entire rod, therefore, may be reduced by only about 20%.

Another possibility is to coat and thus heat the lateral surface not only in the end region, but also to provide one or even several absorbing zones in the central area of the rod. The heating from the pump light is naturally much greater in this region. However, since this section of the rod is situated in cooling water, a thermal insulating layer must be applied in addition to the absorbing layer, since otherwise essentially the cooling water, and only to a lesser extent the rod, would be heated. Of course, this insulating layer must be transparent to the pump radiation.

The thermooptical effects may be fully compensated for by suitable dimensioning of the coated, and therefore heated, regions at the ends and in the central area of a laser rod ("hot rod").

It is even possible to achieve overcompensation. This could be advantageous in reducing the optical stress on the resonator mirrors. Without compensation, for solid-state lasers the positive thermal refractive power of the lens is approximately proportional to the pump power (and therefore to the laser output). The laser beam diameter on the resonator mirrors is reduced as the refractive power increases, so that at maximum pump output a very high power density is produced on the mirrors as the result of maximum laser output and minimum beam diameter. For an overcompensated rod, the laser beam diameter on the resonator mirrors would also be at a maximum at maximum pump power and laser output, and the power density would therefore be greatly reduced.

FIG. 1 shows a cylindrical solid-state laser rod 1 having absorbent coated regions 2 and 3 at the ends, and having an absorbent coated region 4 in the central section which is additionally covered with a layer 5 that is transparent to the pump radiation.

The invention claimed is:

1. Solid-state laser having a laser rod containing laser-active material, comprising one or more regions at the surface of the rod with a radiation-absorbing layer which is heated by pump radiation and laser radiation, thereby counteracting thermooptical effects.

2. Solid-state laser according to claim 1, wherein said one or more regions of the surface are provided with a radiation-absorbing layer at either end of the rod.

3. Solid-state laser according to claim 1, wherein said one or more surface regions are located in the central area of the rod and wherein said one or more surface regions are provided with a radiation-absorbing layer, and in each case a transparent, thermally insulating layer is applied thereupon.

4. The solid-state laser according to claim 1, wherein regions of the surface are provided with a radiation-absorbing layer at both ends of said rod.

5. A method for counteracting thermooptical effects in solid-state lasers comprising the steps of:

providing a laser-rod comprised of a laser-active material and having at least one or more surface regions;

disposing a radiation-absorbing layer on said one or more surface regions;

heating said radiation-absorbing layer by pump radiation or laser radiation, thereby reducing said thermooptical effects.

6. The method according to claim 5 wherein said one or more surface layers are located at either end of said laser-rod.

7. The method according to claim 5, wherein said one or more surface layers are located at both ends of said rod.

8. The method according to claim 5 further comprising the step of selecting a surface region in a central area of said rod; disposing a radiation-absorbing layer on said surface region in said central area; and disposing a transparent, thermally insulating layer on said radiation-absorbing layer on said surface layer.

* * * * *